United States Patent [19]
Scheidl et al.

[11] 4,060,512
[45] Nov. 29, 1977

[54] PHYSIOLOGICALLY UNOBJECTIONABLE STABILIZER COMPOSITIONS FOR HALOGENATED POLYOLEFINS

[75] Inventors: Franz Scheidl, Gersthofen; Werner Sommer, Sulzbach, Taunus, both of Germany

[73] Assignee: Hoechst Aktiengesellschaft, Frankfurt am Main, Germany

[21] Appl. No.: 689,812

[22] Filed: May 25, 1976

[30] Foreign Application Priority Data

May 30, 1975  Germany .............................. 2523909

[51] Int. Cl.$^2$ ................................................ C08K 5/00
[52] U.S. Cl. .......................... 260/45.8 N; 252/400 A;
        252/401; 260/23 H; 260/45.7 P; 260/45.85 R;
                260/45.85 E; 260/45.85 T; 260/45.85 V
[58] Field of Search ...................... 260/45.7 P, 45.8 N,
            260/45,85 R, 45.85 E, 45.85 T, 45.85 V;
                                            252/400 A, 401

[56] References Cited

U.S. PATENT DOCUMENTS

| 3,454,524 | 7/1969 | Hansen | 260/45.8 N |
| 3,833,631 | 9/1974 | Balint et al. | 260/45.85 T X |
| 3,888,818 | 6/1975 | Deblandre et al. | 260/45.8 N |

*Primary Examiner*—Lewis T. Jacobs
*Attorney, Agent, or Firm*—Connolly and Hutz

[57] ABSTRACT

The present invention is related to stabilizer compositions for the stabilization of molding compositions based on halogenated polyolefins, essentially consisting of aluminum salts of certain carboxylic acids, organic phosphites and substituted indoles. Further subject of the invention are the molding compositions which are stabilized with said stabilizers.

The stabilizers according to the present invention show an excellent stabilizing effect.

6 Claims, No Drawings

PHYSIOLOGICALLY UNOBJECTIONABLE STABILIZER COMPOSITIONS FOR HALOGENATED POLYOLEFINS

The considerable stress to which halogenated polyolefins are exposed during mixing, grinding and forming processes, discolors these polyolefins or has other detrimental effects on same so that said polyolefins are no longer applicable for most of the purposes they were originally meant for. Therefore, when processing halogenated polyolefins, heat stabilizers are added most frequently so as to prevent the degradation of the polymers or at least to postpone this degradation as far as possible.

Numerous stabilizers or stabilizer mixtures have been made known for preventing the degradation under heat of halogen-containing polymers, especially of polyvinyl chloride; by means of these stabilizers or stabilizer mixtures these polymers can be processed at elevated temperatures without deterioration of their properties. There may be cited especially compounds of barium, lead, cadmium, calcium, zinc and tin. However, halogenated polymers which have been processed with one of the three stabilizers cited at the start (barium, lead, cadmium) are completely unsuitable as wrapping material for foodstuff or in the medical field, since compounds of barium, lead and cadmium are highly toxic. Certain tinorganic compounds show very good stabilizing properties under heat; however, the tin stabilizers which are usually employed, are very expensive and most of them are also toxic.

Compositions of calcium and zinc salts, especially combined with polyvalent alcohols, have been suggested as non-toxic inexpensive heat stabilizers for halogen-containing plastic compositions (e.g. German Auslegeschrift No. 1,241,106, U.S. Pat. Nos. 3,003,998, 3,003,999, 3,004,000).

Moreover, mixtures are known being constituted of zinc and calcium salts, polyvalent alcohols such as mannitol, sorbitol or trimethylol-propane and 2-phenylindole (German Offenlegungsschrift No. 1,921,242). Though such stabilizer mixtures are quite useful for PVC compositions, they are however unsatisfactory when being used for halogenated polyolefins.

Therefore, for stabilizing halogenated polyolefins the afore mentioned salts or barium, cadmium, lead etc. which are known as good stabilizers for PVC have been suggested; experience showed that good stabilizers for PVC based on metal salts do not necessarily shown an equally good stabilizing effect when being applied in chlorinated polyolefins, but that they often offer no heat protection at all or an insufficient one. Since obviously the chemical process mechanisms for the stabilization of polyvinyl chloride and of halogenated polyolefins differ, there is no way to predict, whether a good or poor PVC stabilizer has the same effect when being applied in halogenated polyolefins. For example, of all the stabilizer compositions containing salts of barium, cadmium and zinc being recommended by U.S. Patent No. 3 243 394 et al. for chlorinated polyolefins, only those with the — toxic — barium salts are well suitable according to our own tests, whilst the stabilization effect is diminished with cadmium salts and nonexistant with zinc salts, even combined with cadmium salts. The mixed salts of bivalent and trivalent metals with aliphatic carboxylic acids and nitric acid, such as aluminum dinitrate stearate, as they are suggested by British Pat. No. 958,277, give little satisfaction in the case of chlorinated polyolefins.

Furthermore, German Offenlegungsschriften Nos. 1,544,996 and 1,544,998 describe as heat stabilizers for halogenated polyolefin compositions of polyvalent alcohols and phenols resp. of polyvalent alcohols and organic phosphites with alkali earth metal salts of phenols and carboxylic acids. Besides the fact that their stabilization effect is barely satisfactory, such compositions have the further disadvantage that the water-solubility of polyvalent alcohols reduces or, in some cases, even prevents at all the scope of applications of thermoplatic compositions which have been stabilized in that way.

There have also been suggested for stabilizing halogenated polyolefins (German Offenlegungsschriften Nos. 1,544,601 and 1,544,604) compounds free from metal such as $\alpha$, $\alpha'$-bisoxyaryl-2,3,5,6-tetrachloro-p-xylene and $\alpha$, $\alpha'$-di-(4-oxyphenyl)-derivatives of p-tolyl ether. In respect to these classifications of compounds there are, however, physiological objections to their use in halogenated polyolefins, if those are employed as wrapping material for food or in the medical field.

The present invention has to aim now at developing physiologically unobjectionable, but highly efficient and all the same inexpensive heat stabilizers for halogenated polyolefins, especially for chlorinated polyethylenes which are used for wrapping foodstuffs and for medical purposes.

It has been found now, surprisingly, that this aim is best served by using stabilizer compositions consisting of A. from 10 to 80 weight % of a neutral or basic aluminum salt of an aliphatic monocarboxylic or dicarboxylic acid having from 6 to 40 carbon atoms or of an aromatic monocarboxylic, dicarboxylic or tricarboxylic acid having from 7 to 25 carbon atoms and carrying optionally alkyl or alkoxyl substituents, or of mixtures thereof, B. from 10 to 70 weight % of a secondary or tertiary organic phosphte or of a cyclic phosphite or mixtures thereof, and C. from 5 to 70 weight % of an indole being substituted in 2-position by an alkyl, alkenyl or aryl group, or mixtures thereof.

This result was not predictable especially in respect to the required heat protection, since individual components of the compositions as per the invention as well as compositions of organic phosphite and substituted indole have only a mediocre stabilization effect on halogenated polyolefins.

The stabilizer compositions according to the invention have a stabilizing effect clearly superior to the stabilizer mixture described in U.S. Pat. No. 3,243,394 et al., consisting of aluminum salts, phosphites and certain phenolic antioxidants; the stabilizer compositions of the invention are equivalent or partially even superior to di-n-octyl-tin-bis-isooctylthioglycolate being otherwise used for the stabilization of chloropolyethylene and which is highly efficient, but expensive.

By aluminum salts which are included in the stabilizer compositions according to the invention at rates of from 10 to 80, preferably from 20 to 70 and especially from 40 to 60 weight %, calculated on the total composition, are to be understood neutral and basic salts of formula Al-(OH)$_x$R$_y$, wherein $x$ = 0 to 2.5, $y$ = 0.5 to 3, $x + y$ is always 3 and R represents a carboxylate radical. The carboxylate radical may derive from a saturated or unsaturated, straight-chain or branched aliphatic monocarboxylic or dicarboxylic acid having in the molecule from 6 to 40, preferably from 8 to 20 carbon atoms, e.g., from caproic acid, caprylic acid, pelargonic acid, capric acid, 3,5,5-trimethyl-hexanoic acid, myristic acid, arachic acid, behenic acid, preferably 2-ethylhexanoic acid, lauric acid, palmitic acid and stearic acid, furthermore from oleic acid and linolenic acid, tall oil fatty acid, coconut fatty acid and soybean oil fatty acid, adipic acid, sebacic acid, suberic acid or one of the so-called "dimeric fatty acids", being carboxylic acids which are obtained during a technological process by dimerization of unsaturated fatty acids. There may as well be used, moreover, the aluminum salts of aromatic monocarboxylic acids, dicarboxylic acids or tricarboxylic acids having from 7 to 25 carbon atoms preferably from 7–16 C-atoms corresponding to the afore mentioned formula, the carbon atoms being either mononuclear or polynuclear, preferably mono- or binuclear. Optionally, these aromatic carboxylic acids may carry one or several substituents of alkyl groups, isoalkyl groups or alkoxyl groups having up to about 12 carbon atoms, preferably from 1 to 6 carbon atoms. There may be cited e.g. benzoic acid, alkylbenzoic acids such as tolyl acid, p-t-butyl-benzoic acid and dodecyl-benzoic acid, anisic acid, phthalic acid, trimellitic acid and naphthalene-carboxylic acids. Preference is given to the corresponding aluminum salts of benzoic acid. There may also be used mixtures of the afore mentioned aluminum salts as component A.

Suitable phosphite components in the stabilizer compositions as per the present claims are secondary or tertiary alkyl phosphites, wherein the alkyl groups have from 6 to 40, preferably from 8 to 30 carbon atoms; furthermore aryl phosphites, wherein the aryl radical which may optionally be substituted in the nucleus by alkyl groups, isoalkyl groups or alkoxyl groups having up to about 20 carbon atoms, preferably from 1 to 10 carbon atoms and especially from 1 to 6 carbon atoms, has from 6 to 30 carbon atoms, preferably from 6 to 10 carbon atoms. There may also be used cyclic organic phosphites, wherein two oxygen atoms of the same or of a second phosphorus atom are connected by means of a bridge, this bridge containing preferably from 4 to 8 carbon atoms. The total number of carbon atoms in this cyclic organic phosphite amounts most usefully to from 10 to 60, preferably from 20 to 50. There may be cited, for example, phosphites being derived from pentaerythrite, such as e.g. distearyl-pentaearythrityl-diphosphite.

Identical or different radicals may be connected to the phosphite radical. There may be cited, for example, tridodecylphosphite, trioctylphosphite, diphenyloctylphosphite, monophenyldioctylphosphite, diphenylphosphite, dioctylphosphite, phenyldodecylphosphite, a preferred phosphite is trisnonylphenylphosphite. There may also be used mixtures of said phosphites.

The stabilizer compositions contain from 10 to 70, preferably from 20 to 60 and especially from 20 to 50 weight % of the phosphites.

The indoles which are substituted in 2-position may be included in the stabilizer composition at rates of from 5 to 70, preferably from 10 to 60 and especially from 10 to 40 weight %. Among this group of substances preference is given to 2-phenylindole. Instead of a phenyl group the substituent in 2-position may as well be an alkyl group having from 1 to 10 carbon atoms, preferably from 1 to 6 carbon atoms, an alkenyl group having from 2 to 10 carbon atoms, preferably from 2 to 6 carbon atoms or an aryl group having from 6 to 25 carbon atoms, preferably from 6 to 15 carbon atoms which may be substituted once or more with alkyl groups having preferably from 1 to 6 carbon atoms.

The stabilizer compositions may be modified by adding physiologically unobjectionable calcium salts and/or magnesium salts. Calculated on 100 parts by weight of stabilizer composition, there may be added up to 100 parts by weight, preferably up to 50 parts by weight of such salts. When carrying out this addition in practice, there is added to 100 parts by weight of a thermoplastic substance to the stabilized a rate of from 0.01 to 2 parts by weight.

The stabilizing effect of the composition is not detrimentally affected in that way. Acid radicals of the calcium salts or magnesium salts are the carboxylic acids which have been specified with the aluminum salts.

The benzoates and stearates of aluminum, calcium and magnesium are especially well suitable; however, it is also possible to combine salts with different acid radicals, e.g. aluminum pentahydroxy stearate with calcium benzoate. It is also possible, of course, to use such salts consisting — as per their formula — of a metal and of mixtures of different carboxylic acids, e.g. a mixture of aluminum stearate and aluminum benzoate, optionally with addition of calcium stearate and/or magnesium stearate.

Halogenation products of homopolymers and copolymers of olefins having from 2 to 6 carbon atoms in the molecule can be protected, especially against the detrimental influence of heat, by means of stabilizer compositions according to the invention. The stabilizer compositions are particularly efficient in chlorinated polyethylene masses having a content in chlorine of from 20 to 80 weight % and a reduced specific viscosity of from 1 to 5 dl/g. Same are also well suitable for stabilizing brominated, iodinated and fluorinated polyolefins and for stabilizing mixtures of halogenated polyolefins and other polymers and of graft polymers, the halogenated polyolefins being the graft basis. The content in halogenated polyolefin in these mixtures or graft polymers should amount to at least 50 weight %, preferably to at least 80 weight %.

Molding compositions being stabilized according to the invention may contain additionally the epoxy stabilizers known for polyvinyl chloride stabilization, such as epoxy resins, long-chain epoxidized olefins with chain lengths of from 10 to 40 carbon atoms (e.g. 1,2-epoxy octadecane), glycidyl compounds such as glycidyl epoxy stearate, preferably epoxidized compounds of fats such as they occur naturally, and oils such as epoxidized castor oil and especially epoxidized soybean oil. Moreover, polyvalent alcohols of the type of glycerol, trimethylol propane, pentaerythrite, sorbitol, mannitol etc. as well as antioxidants of the phenolic kind such as 2,6-di-t-butyl-4-methyl-phenol and 2,2-(4,4'-di-hydroxy diphenyl)dimethyl methane may also be employed as costabilizers. Besides, the halogenated polyolefins which are stabilized according to the invention may also contain plasticizers such as phthalic acid ester, adipic acid ester or phosphorus acid ester, the polymer plasticizers which are usually applied for polyvinyl chloride, such as adipic acid glycol ester and chloroparaffins as well as lubricants, pigments, light stabilizers and fillers. Such costabilizers and additives are described, for example, by J. Voight ("Stabilisierung der Kunststoffe gegen Licht und Waerme", Springer-Verlag, Berlin-Heidelberg-New York (1966).

The stabilizer compositions according to the invention which are employed at rates of from 0.1 to 10 weight %, preferably from 0.2 to 2.0 weight %, calculated on halogenated polyolefin, are added to the polymer either as a mixture or as individual components. They are especially recommendable for processing chlorinated polyethylene being used as wrapping material for foodstuffs or in the medical field. The stabilized molding compositions excel not only by the desirable excellent stability under heat, but also by a very light color shade and good transparency.

The following Examples illustrate the invention:

The specified parts are parts by weight. For evaluation of the stability under heat reference was made to an internal color chart with values from 1 through 6, representing the following shades:

1 = clear as water
2 = yellowish
3 = yellowish-brown
4 = yellow-brown
5 = dark brown
6 = black

EXAMPLES 1 to 14

100 parts by weight each of a chlorinated low-pressure polyethylene containing 39% of chlorine and having a reduced specific viscosity of 1 dl/g were mixed thoroughly with 1.0 part by weight of the various stabilizer compositions specified in table 1 are mixed thoroughly. The mixtures are then applied onto a laboratory-scaled twin-roller device heated to 160° C and rolled out to sheets (pelts) at 20 rpm within a 5 minutes' period. The sheets are then submitted to a thermal stress of 180° C in a circulation-dryer with rotating shelves. For evaluating the stability under heat, spot samples were picked from the rolled-out sheets in chronological intervals as specified in table 2, and their color shades were compared with those of the color chart.

The results in table 2 show that the stabilizer compositions according to the invention (Examples 1 to 8) are clearly superior to the compositions free from metallic soap (Examples 9 and 10) and to basic aluminum stearate (Example 13), and that the results obtained are clearly better than those with compositions mentioned by U.S. Patent No. 3 243 394 (Examples 11 and 12). The compositions according to the invention are equivalent or even slightly superior to the otherwise very efficient tin stabilizer di-n-octyl-tin-bis-isooctyl-thioglycolate (Example 14) which is used for the stabilization of chloropolyethylene.

Table 2

Stabilizing effect of the stabilizer compositions specified in table 1

| Example No. | Stabilizer compositions of table 1 | discoloration of the sheet at a tempering period of | | | | | |
|---|---|---|---|---|---|---|---|
| | | 0' | 15' | 30' | 60' | 90' | 120' |
| | | on tinting strength value | | | | | |
| 1 | a | 1 | 1 | ⊖1 | 2 | 2–3 | 5 |
| 2 | b | 1 | 1 | 1 | 1 | 1–2 | 4 |
| 3 | c | 1 | 1 | 1 | 1 | 2 | 4 |
| 4 | d | 1 | 1 | 1 | 1 | 1–2 | 4–5 |
| 5 | e | 1 | 1 | 1 | 1 | 1–2 | 4 |
| 6 | f | 1 | 1 | 1 | 2 | 2 | 4–5 |
| 7 | g | 1 | 1 | 1 | 1 | 2 | 4–5 |
| 8 | h | 1 | 1 | 1 | 2 | 2–3 | 5 |
| 9 | i | 1 | 2 | 3–4 | 4 | 5 | — |
| 10 | j | 1–2 | 2 | 4 | 5 | 6 | — |
| 11 | k | 1 | 1 | 1 | 3 | 3–4 | 5 |
| 12 | l | 1 | 1 | 1 | 2–33–4 | | 5 |
| 13 | m | 1 | 2 | 3 | 4 | 4 | — |
| 14 | n | 1 | 1 | 1 | 1–2 | 2 | 5 |

What is claimed is:

1. Stabilizer compositions for stabilizing molding compositions of halogenated polyolefins, consisting of
   A. from 10 to 80 weight % of a neutral or basic aluminum salt of an aliphatic monocarboxylic or dicarboxylic acid having from 6 to 40 carbon atoms or of an aromatic monocarboxylic, dicarboxylic or tricarboxylic acid having 7 to 25 carbon atoms, or mixtures thereof,
   B. from 10 to 70 weight % of a secondary or tertiary organic phosphite or of a cyclic phosphite, or mixtures thereof, and
   C. from 5 to 70 weight % of an indole carrying in 2-position as substituent either an alkyl group, an alkenyl group or an aryl group, or mixtures thereof.

2. Stabilizer composition according to claim 1 comprising that the aromatic carboxylic acid of component A carries an alkyl or alkoxyl substituent.

3. Stabilizer composition according to claim 1, containing per 100 parts by weight additionally up to 100 parts by weight of a calcium salt or a magnesium salt or mixtures of these salts of the carboxylic acids specified in claim 1, par. A.

4. A process for the stabilization of thermoplastic molding compositions based on halogenated polyolefins, comprising that into the molding compositions which may already contain conventional co-stabilizers are incorporated from 0.1 to 10 parts by weight — calculated on halogenated polyolefin — of a stabilizer composition composed of
   A. from 10 to 80 weight % of a neutral or basic aluminum salt of an aliphatic monocarboxylic or dicarboxylic acid having from 6 to 40 carbon atoms or Table 1

| Components of the stabilizer compositions | | Compositions according to the invention | | | | | | | | Comparative Examples | | | | |
|---|---|---|---|---|---|---|---|---|---|---|---|---|---|---|
| | | a | b | c | d | e | f | g | h | i | j | k | l | m | n |
| Weight percent | Al₂(OH)₅ (Stearate)₁ | 22 | 40 | 60 | 20 | 11 | 18 | 11 | | | | 12 | 25 | 100 | |
| " | Al (Stearate)₃ | | | | | | | | 11 | | | | | | |
| " | Ca-Stearate | | | | 20 | 11 | 4 | | 11 | | | 12 | 25 | | |
| " | Mg-Stearate | | | | | | | 11 | | | | | | | |
| " | epoxidized soybean oil | 46 | | | | 46 | 46 | 46 | 46 | 53 | | 50 | | | |
| " | Tris-(nonylphenyl)-phosphite | 20 | 30 | 20 | 40 | 20 | 20 | 20 | 20 | 30 | 62 | 20 | 44 | | |
| " | 2-Phenylindole | 12 | 30 | 20 | 20 | 12 | 12 | 12 | 12 | 17 | 38 | | | | |
| " | 4,4'-Butylidene-bis-(6-t-butyl-m-cresol) | | | | | | | | | | | 6 | 6 | | |
| " | Di-n-octyl-tin-bis-iso-octylthioglycolate | | | | | | | | | | | | | | 75 |
| " | Glycerolmonooleate | | | | | | | | | | | | | | 25 | of an aromatic monocarboxylic, dicarboxylic or tricarboxylic acid having from 7 to 25 carbon atoms, or mixtures thereof, B. from 10 to 70 weight % of a secondary or tertiary organic phosphite or of a cyclic phosphite, or mixtures thereof, and C. from 5 to 70 weight % of an indole carrying in 2-position an alkyl, alkenyl or aryl group as substituent, or mixtures thereof.

5. Process according to claim 4, comprising that from 0.1 to 2 parts by weight, calculated on 100 parts by weight of the polymer, of a calcium salt or magnesium salt or mixtures of these salts of the carboxylic acids specified in par. A are added to the molding compositions.

6. Molding compositions based on chlorinated polyethylene containing from 20 to 80 weight % of chlorine and having a reduced specific viscosity of from 1 to 5 dl/g, which contain a stabilizer composition according to claim 1.

* * * * *